May 5, 1931. J. E. SPEICH 1,803,777

FISH LURE

Filed May 31, 1929

WITNESS
K. L. Meade.

INVENTOR
J. E. Speich
BY
Denison & Thompson
ATTORNEYS.

Patented May 5, 1931

1,803,777

UNITED STATES PATENT OFFICE

JULIUS E. SPEICH, OF NEDROW, NEW YORK

FISH LURE

Application filed May 31, 1929. Serial No. 367,600.

This invention relates to a fish lure commonly known as artificial bait involving the use of an elongated float having means at one end for attachment to a fish line and its other end adapted to receive and support a plurality of fish hooks and a flexible rudder.

The main object is to provide a device of this character with means whereby when drawn through the water the entire device exclusive of the line attachment will be rotated by impact with the water.

Another object is to attach the hooks to the rear end of the float to extend rearwardly therefrom in transverse spaced relation and to arrange the flexible rudder between the hooks for the purpose of guiding the float in a substantially rectilinear direction when drawn through the water.

A further object is to provide yielding guards for the points of the hooks and to attach each hook and its guard to the float by one and the same fastening means.

Another object is to provide the yielding guard for each hook with a depression or recess for receiving the point of the hook.

Other objects and uses relating to specific features described will be brought out in the following description.

In the drawings:—
Fig. 1 is an outer face view of a fish lure embodying the various features of my invention except that the draft head is shown in section.

Figure 1:
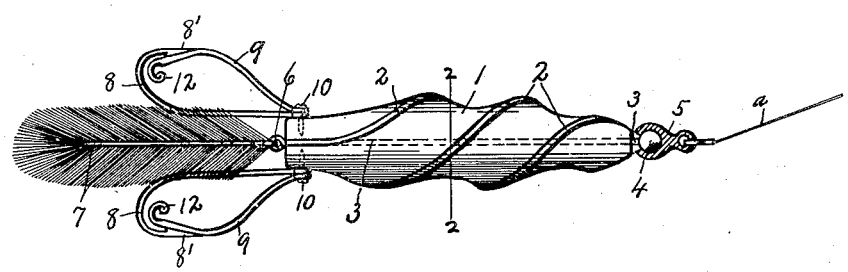
Figure 2:
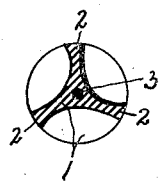
Fig. 2 is a transverse sectional view taken on line 2—2, Fig. 1.
Figure 3:
Fig. 3 is a face view of one of the detached guards showing the depression therein.

As illustrated, this device comprises an elongated float or main body —1— provided with peripherial spiral ribs —2— extending lengthwise thereof to cause said float to rotate by impact in the water when drawn endwise therethrough, the opposite ends of the float being tapered to facilitate its travel through the water.

This float is preferably made of wood for economy and convenience of turning but obviously may be made of any other suitable material without departing from the spirit of the invention.

A wire rod —3— is passed through a central lengthwise opening in the float —1— and has its forward end provided with a spherical member —4— adapted to receive a draft head —5— which is formed with a socket complementary to the spherical member —4—, the rear end of the draft head —5— being crimped or contracted around the corresponding portion of the head —4— to prevent relatively endwise movement of the head and float and at the same time to permit the float with the spherical member —4— thereon to rotate and to tilt laterally relatively to the head.

In other words, the spherical member —4— and draft head —5— constitutes a swivel connection between the fish line —a— and the float —1— to allow free angular and lateral movement of the float relatively to the draft head and line.

The rear end of the wire rod —3— is provided with an eye —6— abutting against the corresponding end of the float —1— to assist in holding the float and wire against relatively endwise movement.

A flexible rudder —7— consisting, in this instance of, a feathery substance has its front end swiveled to the eye —6— and its remaining portions extended rearwardly therefrom to trail in the water and thereby to direct the forward movement of the float through the water in a substantially rectilinear path or in the direction of pull of line —a—.

A plurality of, in this instance, two fish hooks —8— are provided with the usual shanks having their front ends attached to the periphery of the rear end of the float —1— so that the main portions of the hooks will extend from the rear end of the float in transverse spaced relation along the outside of the rudder —7— with the points —8'— facing outwardly.

That is, the rudder —7— is arranged between the rearwardly extending portions of the hooks and extends some distance rearwardly beyond the points —8'— so as to facilitate the directional guiding of the float.

Figure 4:
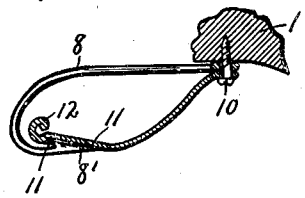
Fig. 4 is a face view of the hook with the apertured end of the shank in section, and a sectional view of the guard, showing also a portion of the float in section, and the means for attaching the hook and guard to the float.

Associated with each hook is a resilient guard member —9— having its intermediate portion arched outwardly away from the shank of the hook and its front end overlapping upon the front end of the hook —8—, the overlapping front ends of the hook —8— and guard —9— being provided with registering apertures for receiving a screw or equivalent fastening device —10— which is engaged with an adjacent side of the rear end of the float —1— as shown more clearly in Fig. 4.

The rear end of each of the guards —9— extends along the point —8'— of the corresponding hook and is provided with a lengthwise depression or recess —11— corresponding approximately to the shape of the hook point —8'— for receiving said point.

The guards —9— are preferably made of light and highly resilient spring metal and when fastened to the front ends of the hooks and to the float —1— are tensioned against the inner faces of the points —8'— with the latter seated in their respective recesses —11—.

The object of these guards is to deflect eel grass, light twigs and the like from the points of the hooks as the device is drawn through the water.

The rear ends of the guards —9— extend some distance beyond the points —8'— within the loops of their respective hooks and are curved inwardly and forwardly at —12— so that if the guards are depressed inwardly by contact with eel grass or similar fibrous materials, the latter will ride freely off from the curved ends —12—.

The object of arching the intermediate portions of the guards —9— outwardly beyond a direct line between their front and rear ends is to more rapidly deflect any light obstacles which may contact therewith away from the points of the hooks and thereby to reduce the liability of contacting such obstacles with the points —8'—.

Operation

As the device is drawn through the water by the line —a—, the impact of the water with the spiral ribs —2— of the float —1— will cause said float and parts carried thereby to rotate more or less rapidly relatively to the draft head —5— while at the same time the trailing of the rudder —7— through the water will keep the float in the direct line of draft of the line —a— while the points of the hooks —8— will face outwardly from the rudder —7— and, by reason of the more or less rapid rotation of the float and parts carried thereby, will offer a more attractive lure to the fish without exposing the exact form of the hooks.

What I claim is:—

1. An artificial fish-bait comprising a body portion having a forwardly tapered front end and spiral peripheral ribs extending rearwardly from the tapered end to cause the body to rotate when drawn through the water, fish-hooks secured to opposite sides and projecting rearwardly in spaced relation beyond the rear end of said body portion, and a flexible rudder attached to the rear end of the body to extend between the hooks.

2. A fish lure comprising an elongated body portion having means at one end for attachment to a fish line, hooks secured to the other end of the body and extending rearwardly therefrom in transversely spaced relation with their hooks facing outwardly, and a flexible rudder attached to the rear end of the body and extended rearwardly between the shanks and in the plane of the hooks.

my hand this 24th day of May, 1929.

In witness whereof I have hereunto set

JULIUS E. SPEICH.